United States Patent [19]

Tsuge

[11] Patent Number: 5,791,461
[45] Date of Patent: Aug. 11, 1998

[54] HOLDER FOR CARD FOR USE IN AUTOMATIC GATE ENTRY

[76] Inventor: Kenji Tsuge, 1-3-16 Higshikaigan Tsujido, Fujisawa, Japan

[21] Appl. No.: 662,669

[22] Filed: Jun. 14, 1996

[30] Foreign Application Priority Data

Jun. 14, 1995 [JP] Japan ................. 7-170512

[51] Int. Cl.$^6$ ............................................. A45C 11/18
[52] U.S. Cl. ........................ 206/39.4; 206/555; 206/807
[58] Field of Search ........................ 206/39.4, 38, 555, 206/449, 455, 37, 39.7, 39, 1.5, 807

[56] References Cited

U.S. PATENT DOCUMENTS

| | | | |
|---|---|---|---|
| 1,658,496 | 2/1928 | Qvarnstrom | 206/39 |
| 4,198,105 | 4/1980 | Gibbs. | |
| 4,202,445 | 5/1980 | Porter | 206/37 |
| 4,616,435 | 10/1986 | Perfect. | |
| 4,792,058 | 12/1988 | Parker | 206/39.4 |
| 4,852,727 | 8/1989 | Oberle | 206/39.4 |
| 4,934,520 | 6/1990 | Okada | 206/39 |
| 5,038,926 | 8/1991 | Van Der Toorn | 206/39.3 |
| 5,107,073 | 4/1992 | Steffen | 206/449 |
| 5,125,505 | 6/1992 | Kruosaki | 206/39.4 |

Primary Examiner—Paul T. Sewell
Assistant Examiner—Nhan T. Lam
Attorney, Agent, or Firm—Edward A. Sokolski

[57] ABSTRACT

A card holder has a frame which is rectangular in configuration with one open end through which a card can be inserted into and removed from the holder. A slide plate is slidably mounted in the frame. When the card is inserted into the frame, it slides along the slide plate and comes to a position where it abuts against a stop ridge formed along the inner edge of the slide plate. With insertion of the card into the holder, the slide plate is driven by the card further into the holder. With such motion of the slide plate, a spring connected thereto at one end and to the holder at the other end is brought to a retracted or loaded position. The spring and card are retained in the retracted position by a retainer detent formed in the holder which latches onto the slide plate and retains the slide plate in position. A manual release button mounted in the frame is used to release the detent from the slide plate, thereby freeing the slide plate and permitting the spring to drive the slide plate and along with it the card to an extended position, with the card out of the holder where it can be inserted into a gate control device for actuating such device.

11 Claims, 5 Drawing Sheets

HOLDER FOR CARD FOR USE IN AUTOMATIC GATE ENTRY

BACKGROUND OF THE INVENTION

1. Field of the Invention

This invention relates to a card holder and more particularly to such a device for holding an identification card for use in entry through an automatically operated gate.

2. Description of the Related Art

Identification cards with appropriate codes magnetically or otherwise placed thereon are often used to enable the entry through gates such as at toll gates for public transportation access, vehicle access to toll roads or parking lots, or personal entry into secured areas. Such cards are generally held loosely in one's wallet and when needed manually placed in a slot at the access gate. The loose handling of such cards frequently results in their damage, resulting in the erasure of portions of the magnetic code information thereon which makes the card inoperable. Also, such manual handling and insertion of the card is not as easy and rapid as would be desired when one is hurried as when commuting on public transportation.

Identification card holders such as that described in Pat. No. 4,616,435 issued Oct. 14, 1986 to Perfect are known in the prior art. None of these, however, employ mechanisms for ejecting the card from its holder for ready insertion into a gate or lock control in response to a manual actuation.

BRIEF SUMMARY OF THE INVENTION

The identification card holder of the present invention is a significant improvement over the prior art in providing a device which provides protection for the card and at the same time facilitates ejection of the card from the holder for use and ready reinsertion into the holder after use has been completed.

The device of the present invention is a card holder having a three sided rectangular frame with a slide plate slidably mounted therein into which a card can be readily inserted. A spring is mounted in the holder, this spring being connected to the slide plate and driven thereby to a retracted or loaded position with the insertion of the card therein. When the card is fully inserted into the holder, a detent in the holder engages a slotted portion of the slide plate, thereby latching the slide plate and the spring in its loaded position, with the card being retained within the holder. A button is connected to the detent so that when this button is manually actuated, the detent is released from the slide plate to permit the spring to go to its extended unloaded position thereby driving the slide plate and the card out of the holder.

It is therefore an object of the invention to provide an improved identification card holder which permits ready release of the card for use in a lock release mechanism.

It is a further object of the invention to facilitate the use and retention of an identify card for use in automatically gaining entry through a toll booth or secured door or gate.

Other objects of the invention will become apparent in connection with the following description in conjunction with the accompanying drawings.

DETAILED DESCRIPTION OF THE INVENTION

Figure 1:
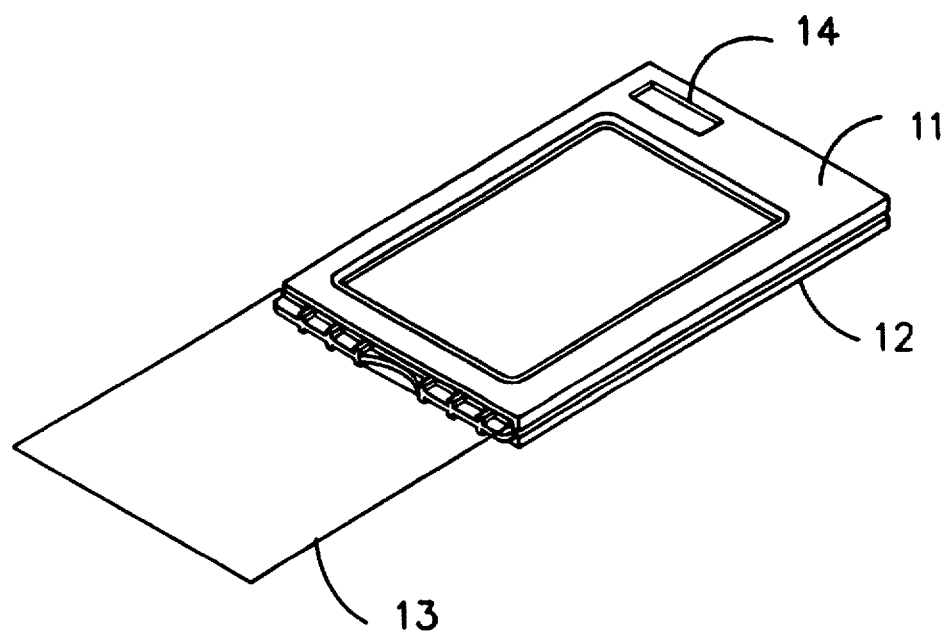
FIG. 1 is a top left hand perspective view of a preferred embodiment of the invention.
Figure 2:
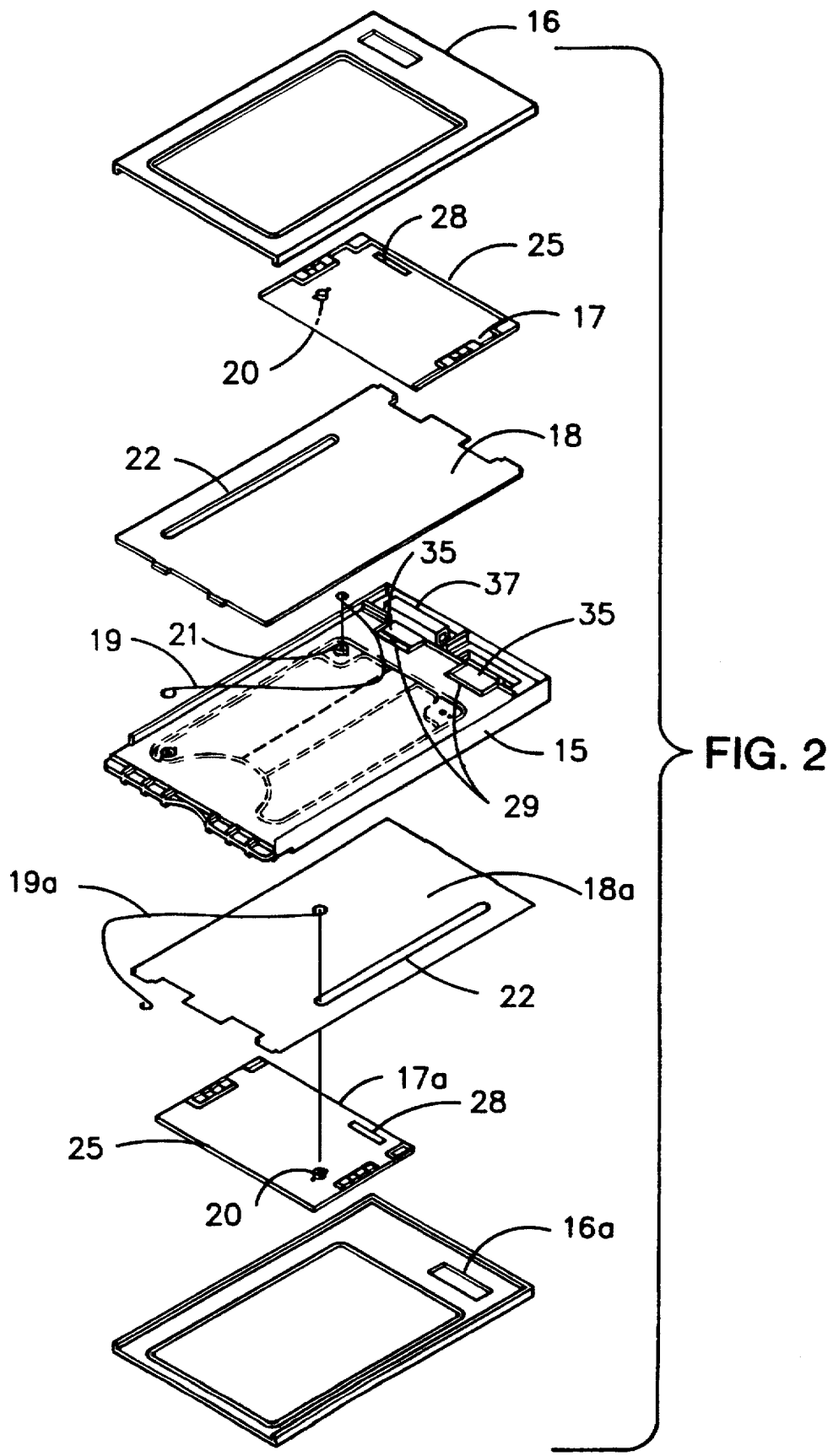
FIG. 2 is an exploded perspective view of the preferred embodiment of the invention.

Referring now to FIGS. 1 and 2, a preferred embodiment of the invention is illustrated. As show in these two Figures, a pair of similar holder units 11 and 12 are connected together in back to back relationship. Each such unit holds a separate magnetic card 13 which can be used to pass through a gated entry such as a turnstile in a subway or bus station or a locked door to a security area. The holder shown is adapted to hold two such cards which can be used for entering through different gated entries but a single holder can be employed if only one card is utilized. As to be explained in detail in connection with FIGS. 3–6, card 13 is inserted into the holder driving a slide plate to a retracted position where the plate is latched in position against the tension of a spring. The slide plate is released by actuating button 14 and the slide plate and along with it the card are driven to an extended position whereat the card is partially driven out of the holder so it can be inserted into a gate control mechanism.

As shown in FIG. 2, which is an exploded view, upper holder 11 and lower holder unit 12 are mirror images of each other and are assembled onto a central frame 15. Each such holder unit includes an outer frame 16,16a respectively into which a slide plate 17,17a; a guide plate 18,18a; and a spring 19,19a are successively installed. The spring 19, as shown in the upper holder unit 11, is attached at one end thereof to a post 20 on slide plate 17 and at the other end to a post 21 on the central frame. Guide plates 18 and 18a have slots 22 formed therein along which the posts 20 of the slide plates ride and are guided in their travel. The slide plates 17, 17a have ridges 25 formed along their inner edges against which the card abuts when inserted in the holder. The slide plates further have slotted portions 28 formed therein. These slotted portions are engaged by detents 29 formed on resilient arms 35 which are supported at one end thereof on central frame 15. These arms are actuated by buttons 37 to release the slotted portions from the detents and permit the springs to drive the slide plates to their extended positions. The spacing between outer frames 16 and 16a and plates 17 and 17a, respectively is such that the card 13 will fit snugly therebetween and will be held in place but can readily be withdrawn manually from the holder.

Figure 3:
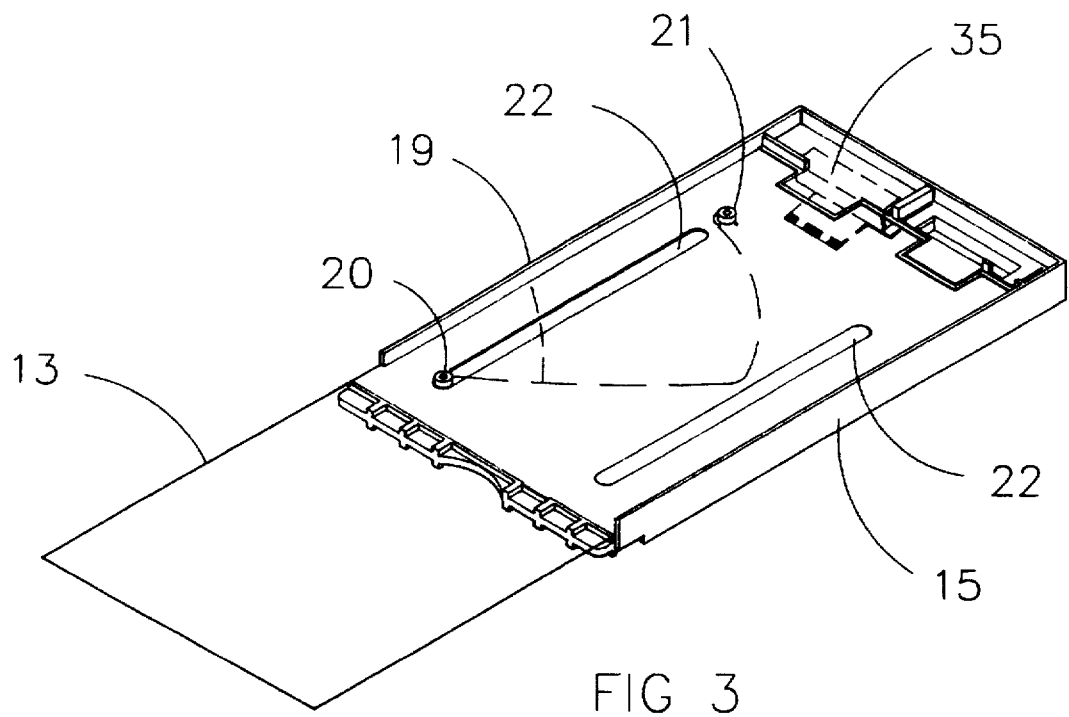
FIG. 3 is a bottom left hand perspective view of the operating mechanism of the preferred embodiment in its extended position.
Figure 4:
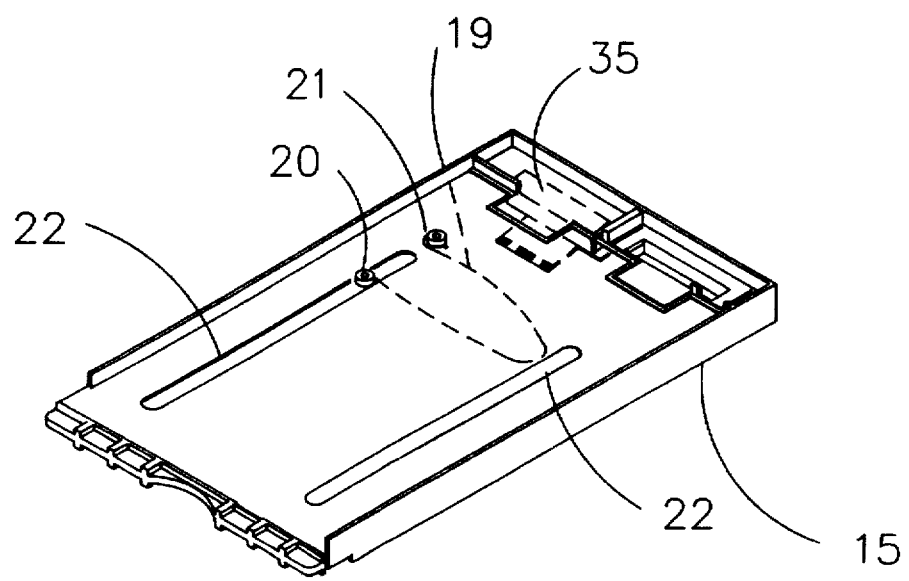
FIG. 4 is a bottom left hand perspective view of the operating mechanism of the of the preferred embodiment in its retracted position.
Figure 5:
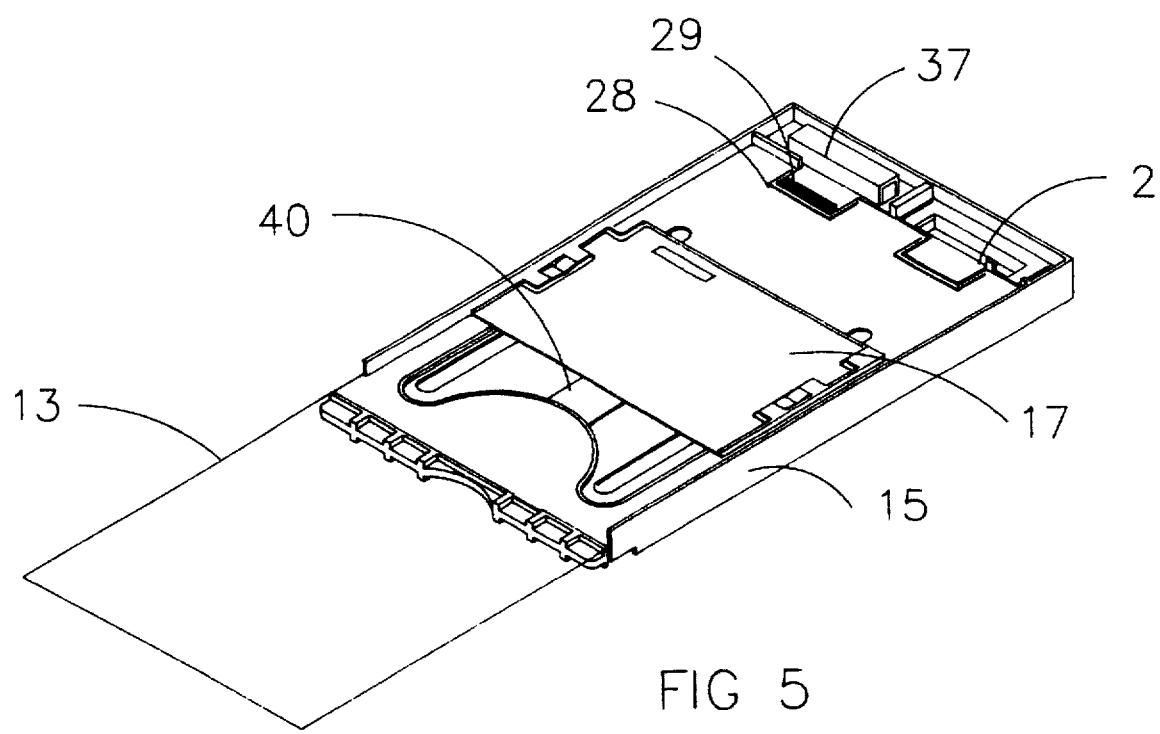
FIG. 5 is a top left hand perspective view of the operating mechanism of the preferred embodiment in its extended position.
Figure 6:
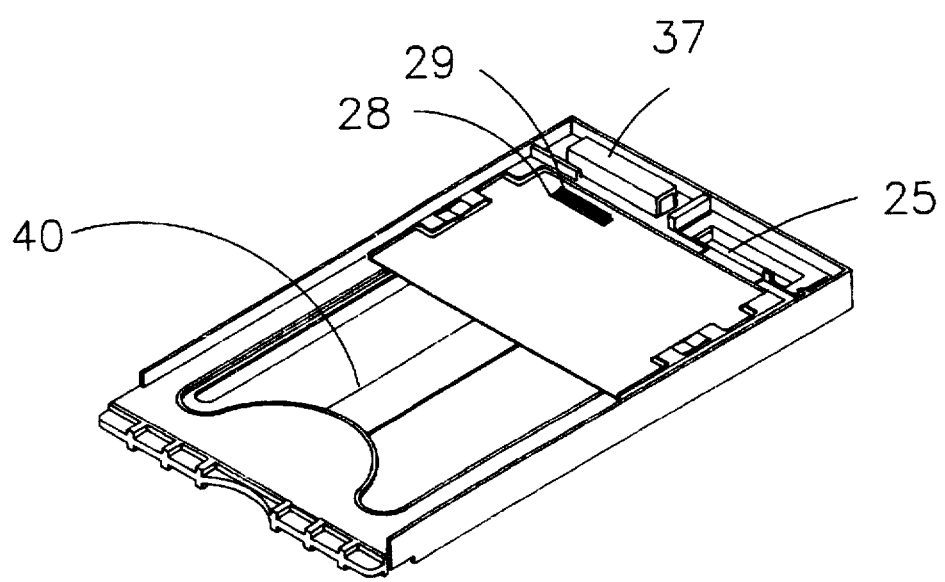
FIG. 6 is a top left hand perspective view of the operating mechanism of the preferred embodiment in its retracted position.

Referring now to FIGS. 3–6, the operating mechanism of the holder of the invention is illustrated. FIGS. 4 and 6 show the opposite sides respectively of the slide plate in the retracted position while FIGS. 3 and 5 show the opposite sides respectively of the slide plate in the extended position.

As shown in FIGS. 4 and 6, detent 29 which is attached to button 37 by a resilient arm 35 lies within slotted portion 28 of the slide plate 17 and thereby latches onto the slide plate to retain the slide plate in the retracted position against the resilient action of spring 19. The post 20 of the slide plate lies in slot 22 of guide plate 18 so that its travel is guided therealong. Central frame 15 has a flat strip 40 running between the opposite end portions thereof, this strip acting to keep the spring in a flattened configuration.

FIGS. 3 and 5 show the slide plate in the extended position. As shown in these Figures, when button 37 is actuated, detent 29 is drawn out of slotted portion 28 of the slide plate thereby permitting the slide plate to be driven by spring 19 to the extended position and driving the card 13 partially out of the holder.

Figure 7:
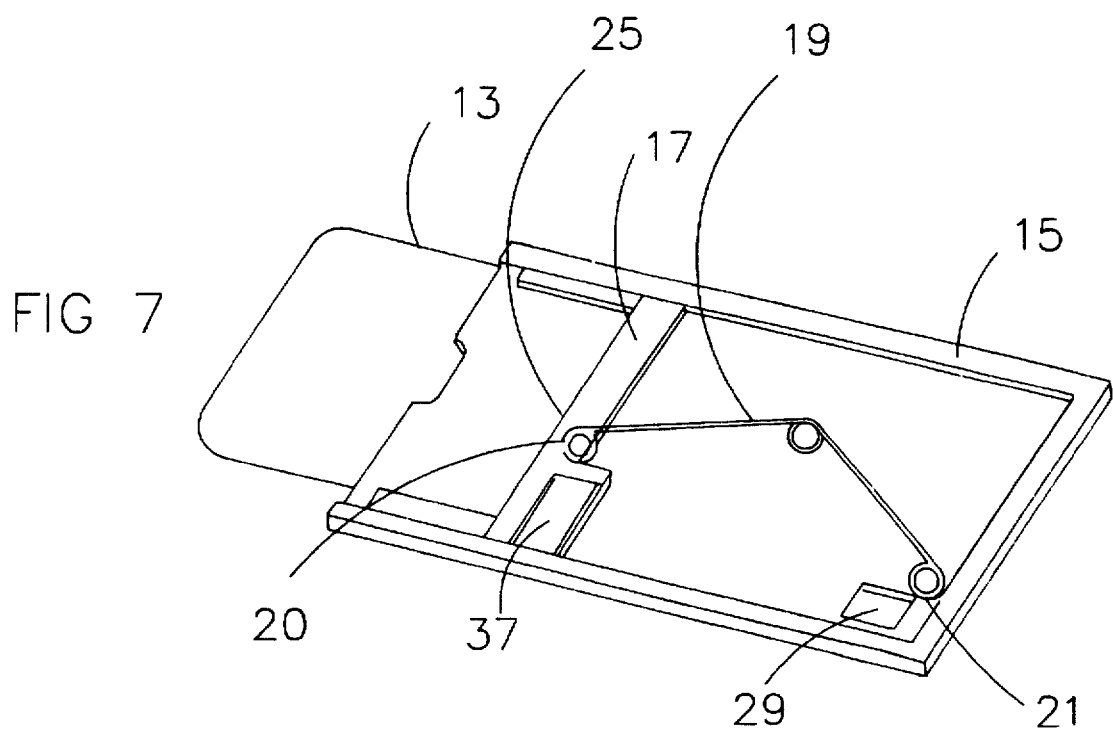
FIG. 7 is a top left hand perspective view of the operating mechanism of a second embodiment of the invention.

Referring now to FIG. 7, a second embodiment of the invention is shown. In this embodiment, as for the preferred embodiment, spring 19 is attached at one end thereof to a post 20 on the slide plate and at the other end thereof to a post 21 on frame 15. The slide plate 17 is slidably mounted in the frame and has a ridge 25 against which the edge of the card 13 abuts. The slide plate 17 has a release button 37 thereon. When the slide plate is driven to the retracted position by the card, an arm on the release button engages latching detent 29 to retain the slide plate in the retracted position until release button 37 is actuated.

Figure 8:
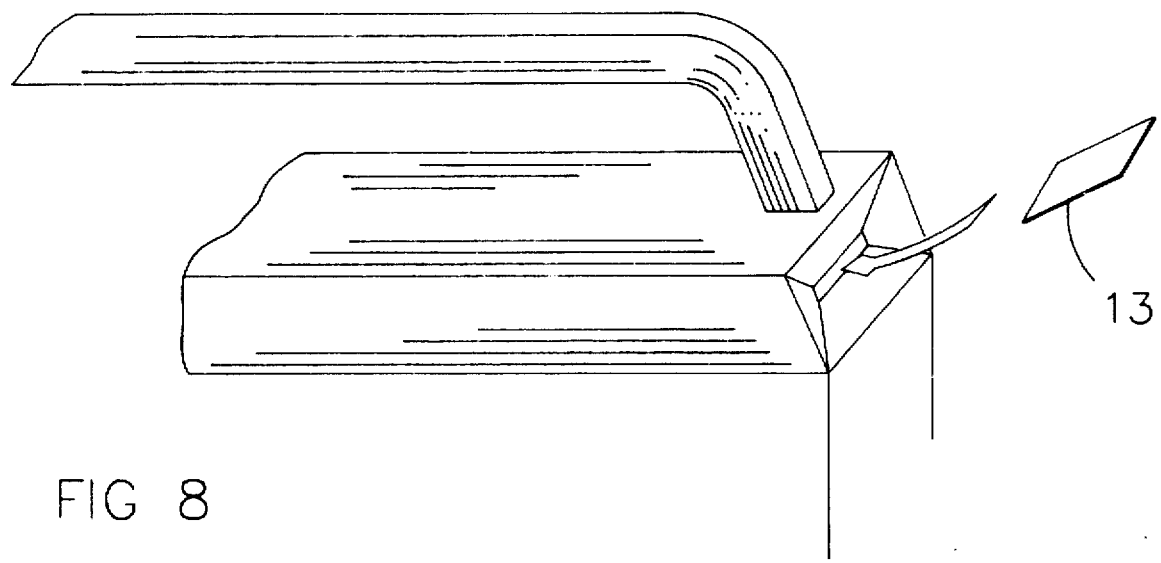
FIG. 8 is a top perspective view illustrating the use of the device of the invention in passing through a turnstile.

Referring now to FIG. 8, the use of the holder mechanism in gaining entrance through a turnstile is illustrated. Magnetic card 13 is ejected from holder 11 into the slot of the turnstile, as indicated by the arrow. The card is retrieved at the other side of the turnstile by placing the holder on the card so the card can reenter the holder and drive the slide plate to the retracted position.

While the invention has been described and illustrated in detail, it is to be clearly understood that this is intended by way of illustration and example only and is not to be taken by way of limitation, the scope of the invention being limited only by the terms of the following claims.

I claim:

1. A holder for a card comprising:
   a frame having opposing side walls and an end wall,
   a slide plate slidably mounted in said frame for motion between a retracted position and an extended position,
   spring means for urging said slide plate towards its extended position,
   said slide plate having a post to which said spring means is attached,
   a guide plate with an elongated slot formed therein, said post being fitted in said guide plate slot and sliding therealong with motion of said slide plate,
   the card being mounted on said slide plate for movement therewith between said retracted and extended positions,
   means for retaining said slide plate in said retracted position against the urging of said spring means, and
   means for actuating said retaining means to release said slide plate to permit the spring means to drive the slide plate to the extended position, thereby driving the card out of the frame.

2. The holder of claim 1 wherein said spring means comprises a spring attached at one end thereof to said slide plate and at the other end thereof to said frame.

3. The holder of claim 1 wherein said slide plate has an inner edge running substantially parallel to and directly opposite the end wall of said frame, said inner edge having a ridge running therealong against which the card abuts.

4. The holder of claim 3 wherein said means for retaining the slide plate in said retracted position comprises a detent formed on said holder, said detent engaging said slide plate.

5. The holder of claim 4 wherein said means for disengaging said detent from said ridge comprises a button mounted on said holder and a resilient arm interconnecting said detent and said button.

6. A holder for a card comprising:
   a frame having opposing side walls and an end wall,
   a slide plate slidably mounted in said frame, said slide plate having an inner edge running substantially parallel to and directly opposite the end wall of said frame, said inner edge having a ridge running therealong,
   a spring attached at one end thereof to said slide plate and at the other end thereof to said frame,
   said slide plate having a post to which said spring is attached,
   a guide plate with an elongated slot formed therein, said post being fitted in said guide plate slot and sliding therealong with motion of said slide plate,
   said card being slidably mounted on said slide plate and abutting against the ridge of said slide plate when fully installed thereon,
   a detent formed on said holder, said detent engaging said slide plate when said card is fully installed in said frame and has driven said slide plate to bring said spring to a retracted loaded position, said detent retaining the slide plate and the spring in said retracted position, and
   means for disengaging said detent from said slide plate to permit the spring to go to an extended position, thereby driving the card out of said frame.

7. A holder for a card comprising:
   a frame having opposing side walls and an end wall,
   a slide plate slidably mounted in said frame, said slide plate having an inner edge running substantially parallel to and directly opposite the end wall of said frame, said inner edge having a ridge running therealong, said slide plate having a slot formed therein,
   a spring attached at one end thereof to said slide plate and at the other end thereof to said frame,
   said card being slidably mounted on said slide plate and abutting against the ridge of said slide plate when fully installed thereon,
   a detent formed on said holder, said detent fitting into the slot formed in said slide plate and engaging the sides thereof when said card is fully installed in said frame and has driven said slide plate to bring said spring to a retracted loaded position said detent retaining the slide plate and the spring in said retracted position, and
   means for disengaging said detent from said slide plate to permit the spring to go to an extended position thereby driving the card out of said frame.

8. The holder of claim 7 wherein said spring is a wire spring.

9. The holder of claim 7 wherein said means for disengaging said detent from said ridge comprises a button mounted on said holder and a resilient arm interconnecting said detent and said button.

10. The holder of claim 7 and further including a second holder substantially the same as said holder and attached to said holder in back to back relationship therewith.

11. The holder of claim 7 wherein the spacing between the slide plate and the frame is close enough to retain the slide plate snugly in the holder.

* * * * *